(12) United States Patent
Nakano et al.

(10) Patent No.: US 6,498,776 B1
(45) Date of Patent: Dec. 24, 2002

(54) NEAR FIELD LIGHT EMITTING ELEMENT AND OPTICAL HEAD

(75) Inventors: Takashi Nakano, Tsukuba (JP); Junji Tominaga, Tsukuba (JP); Nobufumi Atoda, Tsukuba (JP); Akira Sato, Shiga (JP); Takuji Hatano, Suita (JP)

(73) Assignees: Minolta Co., Ltd., Osaka (JP); Japan as represented by Director-General of Agency of Industrial Scientific and Technology, Tsukuba (JP)

( * ) Notice: Subject to any disclaimer, the term of this patent is extended or adjusted under 35 U.S.C. 154(b) by 0 days.

(21) Appl. No.: 09/494,180

(22) Filed: Jan. 31, 2000

(30) Foreign Application Priority Data

Feb. 1, 1999 (JP) .......................................... 11-023969

(51) Int. Cl.$^7$ .............................................. G11B 7/135
(52) U.S. Cl. .................................. 369/112.23; 369/13.33
(58) Field of Search .......................... 369/13.33, 112.23, 369/112.24, 118, 126; 359/819, 368, 385, 718, 719

(56) References Cited

U.S. PATENT DOCUMENTS

| | | | |
|---|---|---|---|
| 5,689,480 A | 11/1997 | Kino | ............................ 369/14 |
| 6,055,220 A | * 4/2000 | Mamin et al. | .............. 359/819 |

* cited by examiner

Primary Examiner—W. R. Young
Assistant Examiner—Kimlien Thi Le
(74) Attorney, Agent, or Firm—Morrison & Foerster LLP

(57) ABSTRACT

A near field light emitting element has a first film made of e.g. Al, an intermediate film made of e.g. SiN and a second film made of e.g. Al on an emergent surface of a solid immersion lens made of a high-refractive material. A first hole is made in the first film, and a second hole is made in the second film. The second hole is smaller in area than the first hole.

19 Claims, 6 Drawing Sheets

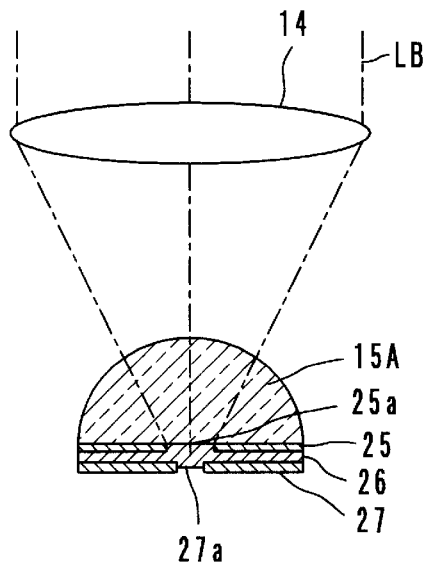
F I G. 2 A
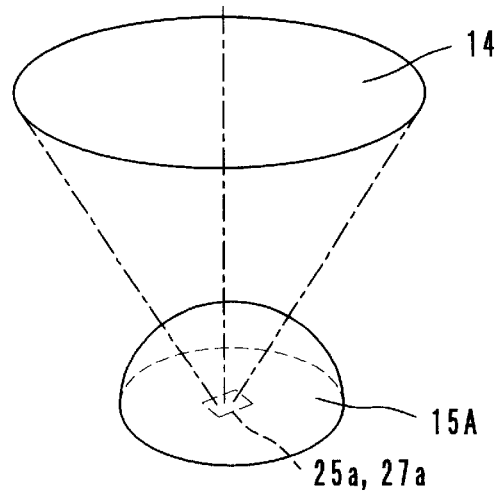
F I G. 2 B

NEAR FIELD LIGHT EMITTING ELEMENT AND OPTICAL HEAD

This application is based on application No. 11-23969 filed in Japan, the content of which is hereby incorporated by reference.

BACKGROUND OF THE INVENTION

1. Field of the Invention

The present invention relates to a near field light emitting element and an optical head which are suited to be employed in a high density optical memory (for recording/reading), a high resolution microscope or an optical processing device.

2. Description of Related Art

In the art of optical memories which optically record and read information, in recent years, with speed-up of computer processing and development of multimedia, high-density devices which are capable of recording an extremely large volume of information are demanded, and in order to comply with the demand, a near field optical recording technique is suggested. In a conventional optical memory using a laser beam, the recording density is limited depending on the diffraction limit of light, and such an optical memory can record and read marks of sizes of at least light wavelength (several hundred nanometers). A recently proposed optical memory which uses near field optics radiates light to a recording medium (optical disk) for recording/reading with the optical head and the recording medium arranged at an interval of only some dozen nanometers. At this time, the optical memory uses a fiber probe with a minuscule aperture smaller than light wavelength and a solid immersion lens. Thereby, in spite of the diffraction limit, it becomes possible to record and read minuscule marks of some dozen nanometers.

Such a near field optical technique is applicable to optical processing techniques for making minuscule patterns beyond the diffraction limit of light and to high resolution microscopes.

In the field of near field optical techniques, optical probes which permit minuscule light spots of a large quantity of light are desired. By adopting a method in which an aperture is made at a tapered end of an optical fiber, the size of the aperture is approximately 100 nm, and only 1/100 or less of light can transmit the optical fiber, that is, the quantity of transmitted light is extremely small.

In order to solve this problem, making a tapered hole by anisotropic etching of a silicon substrate has been suggested (U.S. Pat. No. 5,689,480). By adopting this method, it is possible to increase the quantity of transmitted light. In this method, however, the hole is made in a film of monocrystal silicon by anisotropic etching, which is complicated and costs much.

SUMMARY OF THE INVENTION

An object of the present invention is to provide a near filed light emitting element and an optical head which can be fabricated in simple processes and use light efficiently.

In order to attain the object, a near field light emitting element according to the present invention comprises an element body; a first light transmitting portion which is provided on an emergent side of the element body; an intermediate film which is provided on an emergent side of the first light transmitting portion; and a second light transmitting portion which is provided on an emergent side of the intermediate film, the second light transmitting portion being smaller in area than the first transmitting portion. As the element body, for example, a solid immersion lens is used. At least one of the light transmitting portions is a minuscule hole made in a film or a minuscule light transmitting portion which is provided in a multi-layered film by alloying materials of the multi-layered film with each other under a high temperature.

According to the present invention, a light beam incident to the near field light emitting element is converged on the first light transmitting portion, and this converged light comes to the second light transmitting portion via the intermediate film. At the second light transmitting portion, the light beam is further narrowed and is emergent as near field light (in other words, optical near field). The light transmittance of the near field light is higher than the light transmittance when a conventional single slit is used and is almost equal to or higher than the light transmittance when a tapered slit is used.

Further, the first and second light transmitting portions and the intermediate film of the near field light emitting element can be formed by a conventional thin film forming technique and a conventional etching technique, which are easier than the method wherein a monocrystal silicon film is subjected to anisotropic etching.

Further, in the near field light emitting element according to the present invention, preferably, the first and second light transmitting portions are slits which extend in parallel to each other. In this case, the width of the second light transmitting portion (slit) is smaller than the width of the first light transmitting portion (slit). Although desired transmittance can be obtained merely with this arrangement, the transmittance can be further improved by making the direction of polarization of incident light correspond to the extending direction of the slits.

BRIEF DESCRIPTION OF THE DRAWINGS

This and other objects and features of the present invention will be apparent from the following description with reference to the accompanying drawings, in which:

FIGS. 2A and 2B show a first embodiment of a near field light emitting element according to the present invention, FIG. 2A being a sectional view and FIG. 2B being a perspective view;

DETAILED DESCRIPTION OF THE PREFERRED EMBODIMENTS

Preferred embodiments of a near field light emitting element and an optical head according to the present invention are described with reference to the accompanying drawings.

General Structure of Optical Head; See FIG. 1

Figure 1:
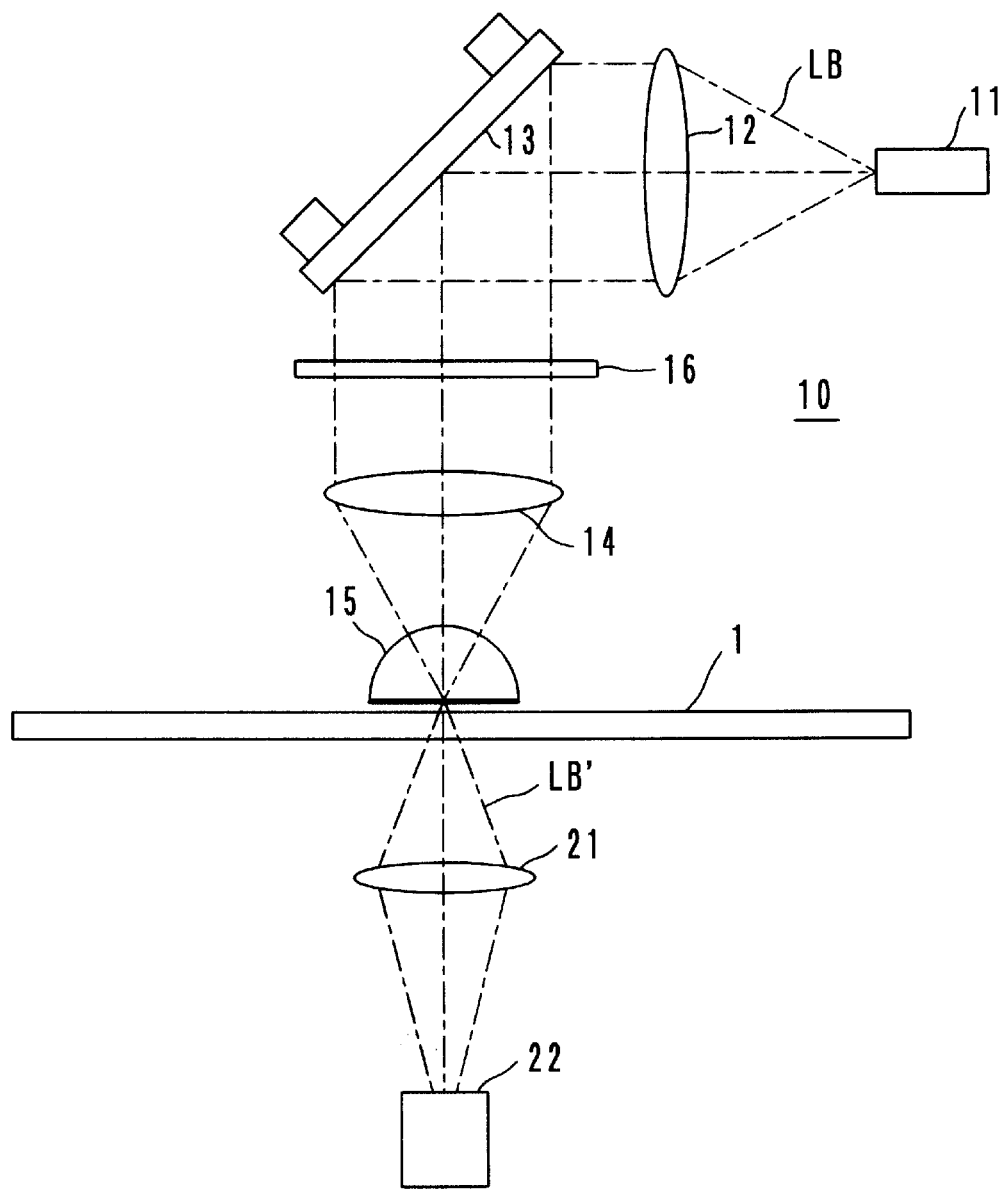
FIG. 1 is a schematic structural view of an optical head which is an embodiment of the present invention.

Referring to FIG. 1, the general structure of an optical head 10 is described. The optical head 10 is to record and read information onto and from an optical disk 1. A light beam LB (a divergent bundle of rays) emitted from a laser source 11 is changed into a parallel bundle of rays by a coupling lens 12, and the light beam is reflected by a mirror 13 and converged by a convergent lens 14. Then, the light beam irradiates the optical disk 1 via a hemispherical solid immersion lens 15. A light beam LB' which has passed through the optical disk 1 is converged by a convergent lens 21 and is detected by an optical detector 22. The optical detector 22 converts an optical signal into an electric signal, and the output of the detector 22 is sent to a reading circuit (not shown) to be processed into a reading signal.

The solid immersion lens 15, as is well known, is based on the principle of liquid immersion lens microscope (the principle of improvement in resolution of a microscope by a liquid immersion method) and is made of a material with a high refractive index. The solid immersion lens 15 converges the light beam LB which was incident thereto through its spherical surface on the center of its emergent plane. The converged light beam LB is narrowed at a light transmitting portion (hole or a solid light transmitting portion) which will be described later. Then, the light beam LB effuses therethrough to a very small area as near filed light (in other words, optical near field) and irradiates a recording layer of the optical disk 1. Thereby, recording/reading of information is carried out.

In the optical path of the light beam LB, a polarizer 16 is provided if necessary. The polarizer 16 is to align the direction of polarization of the light beam LB.

First Embodiment of Near Field Light Emitting Element; See FIGS. 2A and 2B

FIGS. 2A and 2B show a solid immersion lens 15A as the first embodiment. The solid immersion lens 15A is made of glass with a refractive index n of 1.7 and is a hemisphere with a radius of 2 mm. The wavelength λ of the laser beam LB is 488 nm, and the width of the beam spot is 640 nm. The numerical aperture NA of the convergent lens 14 is 0.6.

On the emergent plane of the solid immersion lens 15A, a first film 25 with a first hole 25a, an intermediate film 26, and a second film 27 with a second hole 27a. The first film 25 is an Al film with a thickness of 30 nm, and the first hole 25a is a square of 400 nm×400 nm. The intermediate film 26 is a SiN film with a thickness of 65 nm. The second film 27 is an Al film with a thickness of 30 nm, and the second hole 27a is a square of 200 nm×200 nm. Each of the films 25, 26 and 27 is formed by any of various thin film forming methods, such as sputtering, vapor deposition, etc. The holes 25a and 27a are made by etching, photolithography or the like so as to overlap.

In the solid immersion lens 15A of the above structure, the light beam LB which was incident through the spherical surface is converged on the emergent plane. More specifically, the light beam LB is converged on the first hole (aperture) 25a and travels to the second hole (aperture) 27a via the intermediate film 26, and the light beam LB is further narrowed by the second hole 27a and is emergent from the solid immersion lens 15A as near field light at a relatively high transmittance.

The holes 25a and 27a can be made by a thin film forming technique which is generally used for fabrication of semiconductors and a fine processing technique such as etching, photolithography or the like, and it is unnecessary to carry out complicated anisotropy etching. Thus, the holes 25a and 27a can be made easily and at low costs.

Second Embodiment of Near Field Light Emitting Element; See FIGS. 3, 4 and 5

Figure 3A:
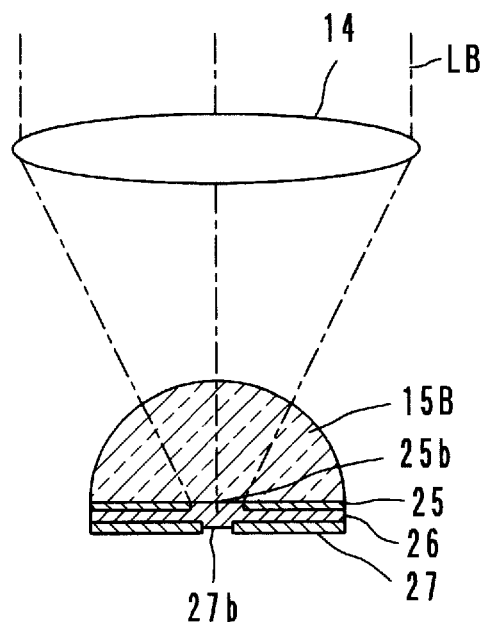
FIGS. 3A and 3B show a second embodiment of a near field light emitting element according to the present invention, FIG. 3A being a sectional view and FIG. 3B being a perspective view.
Figure 3B:
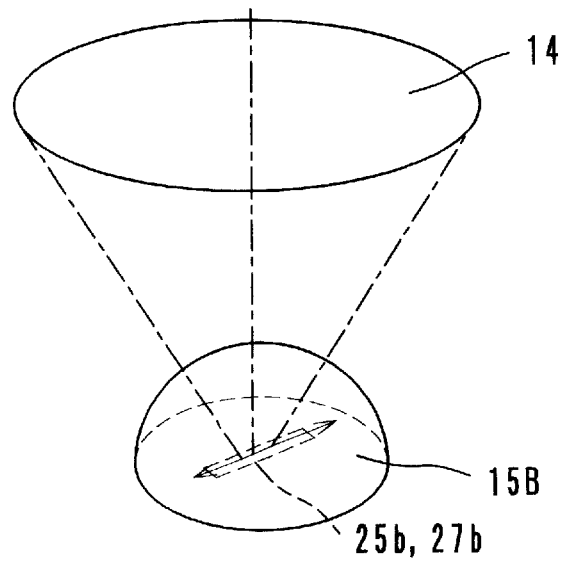

FIGS. 3A and 3B show a solid immersion lens 15B as the second embodiment. Like the solid immersion lens 15A, the solid immersion lens 15B is made of glass of which refractive index n is 1.7 and is a hemisphere with a radius of 2 mm. The wavelength λ of the laser beam LB is 488 nm, and the width of the beam spot is 640 nm. The numerical aperture NA of the convergent lens 14 is 0.6. The first film 25, the intermediate film 26 and the second film 27 are the same in thickness and in material as those in the first embodiment. In the second embodiment, however, the first film 25 has a slit 25b with a width of 400 nm instead of the hole 25a, and the second film 27 has a slit 27b with a width of 200 nm instead of the hole 27a. These slits 25b and 27b are arranged one upon another in parallel. The functions of the slits 25b and 27b are the same as those of the holes 25a and 27a. The second embodiment brings the same effects as the first embodiment does.

In the second embodiment, it is preferred to provide a polarizer 16 in the optical path incident to the solid immersion lens 15B as shown by FIG. 1 so as to polarize the light beam LB in a fixed direction. The direction of polarization is the extending direction of the slits 25b and 27b. Light of which direction of polarization (direction of oscillation of electric field) corresponds to the extending direction of the slits 25b and 27b is referred to as TE waves. On the other hand, light of which direction of polarization is perpendicular to the extending direction of the slits 25b and 27b is referred to as TM waves.

Figure 4A:
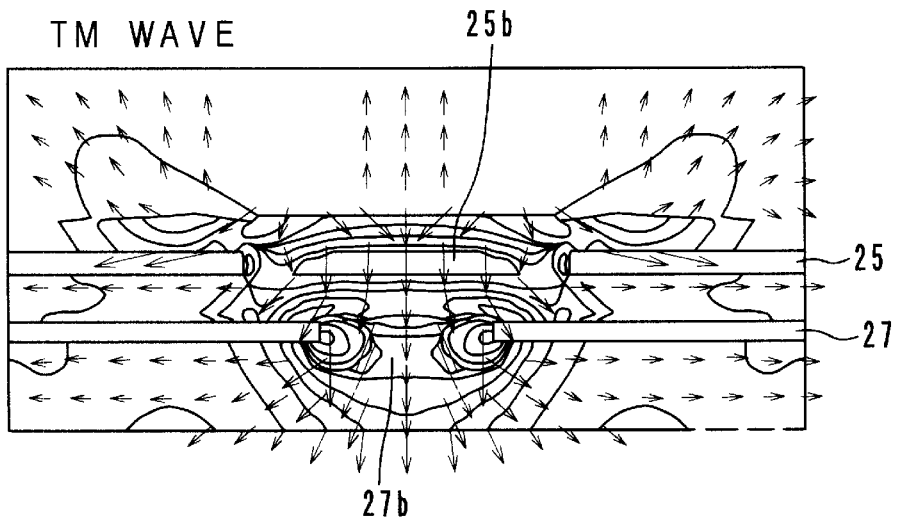
FIGS. 4A and 4B are diagrams showing distributions of the intensity of electric field of near field light in the second embodiment, FIG. 4A showing a case wherein the near field light is of TM waves and FIG. 4B showing a case wherein the near field light is of TE waves.
Figure 4B:
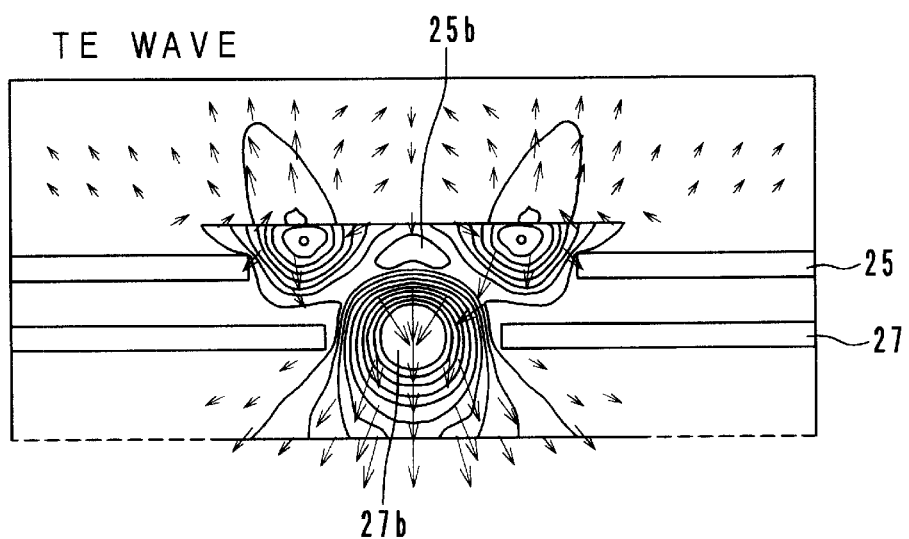
Figure 5A:
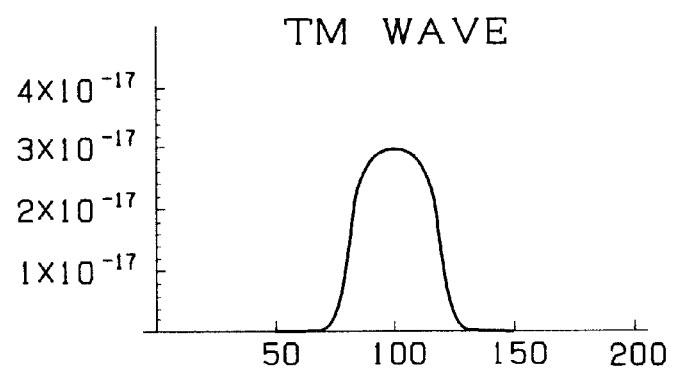
FIGS. 5A and 5B are graphs showing the transmitted power of near field light in the second embodiment, FIG. 5A showing a case wherein the near field light is of TM waves and FIG. 5B showing a case wherein the near field light is of TE waves.
Figure 5B:
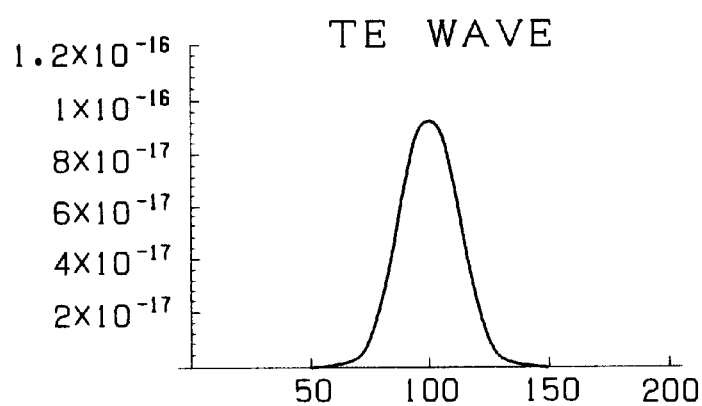

The present inventors analyzed the transmittances of the slits 25b and 27b with the second embodiment used as a model, adopting a simulation method which is called two-dimensional finite difference time domain method. FIGS. 4A and 4B show distributions of the intensity of electric field of near field light. FIG. 4A shows a case wherein the near field light is of TM waves, and FIG. 4B shows a case wherein the near field light is of TE waves. The arrows in FIGS. 4A and 4B indicate the directions of electric field, the lengths of the arrows indicating the field strengths. FIGS. 5A and 5B show the transmitted power of near field light in a place at a distance of 30 nm from the slit 27b. FIG. 5A shows a case wherein the near field light is of TM waves, and FIG. 5B shows a case wherein the near field light is of TE waves. As is apparent from FIGS. 4A, 4B, 5A and 5B, light of TE waves has a smaller beam spot and high intensity. Calculated values of the diameters of beam spots and the transmittances are shown in Table 1 below.

Table 1 shows not only these calculated values according to the second embodiment of the present invention but also calculated values in using a single slit with a width of 200 nm and calculated values in using a tapered slit with a width of 200 nm.

TABLE 1

| | Kind of Slit | | Beam Diameter (nm) | Transmittance (%) |
| --- | --- | --- | --- | --- |
| Present Invention | Double Slit | TM waves | 195 | 36 |
| | | TE waves | 135 | 85 |
| Prior Art | Single | TM waves | 195 | 35 |

TABLE 1-continued

| Kind of Slit | | Beam Diameter (nm) | Transmittance (%) |
|---|---|---|---|
| Slit | TE waves | 135 | 66 |
| Tapered Slit | TM waves | 205 | 32 |
| | TE waves | 135 | 78 |

As is apparent from Table 1, with respect to the diameter of beam spot, the present invention brought almost the same results as the prior arts. With respect to the transmittance, however, the present invention brought preferable results than the prior art using a single slit and than the prior art using a tapered slit.

Third Embodiment of Near Field Light Emitting Element; See FIG. 6

Figure 6:
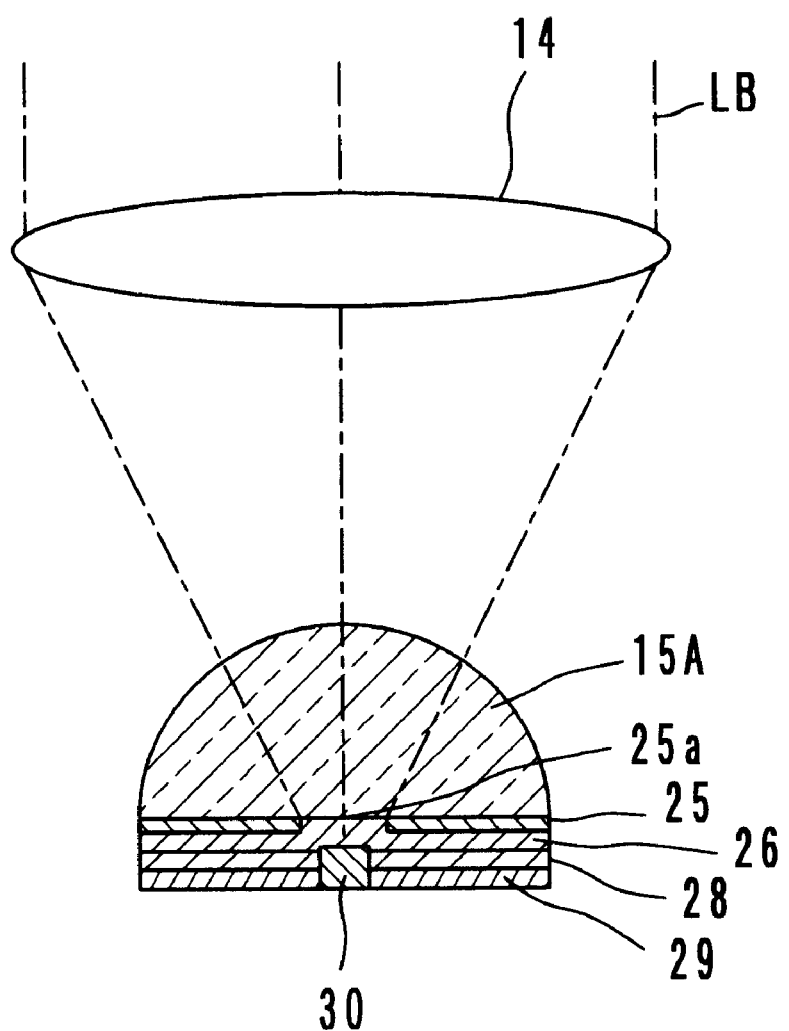
FIG. 6 is a sectional view of a third embodiment of a near field light emitting element according to the present invention.

FIG. 6 shows a solid immersion lens 15C as the third embodiment. Like the solid immersion lenses 15A and 15B, the solid immersion lens 15C is made of glass of which refractive index n is 1.7 and is hemispherical with a radius of 2 mm. The wavelength λ of the laser beam LB is 488 nm, and the width of the beam spot is 640 nm. The numerical aperture NA of the convergent lens 14 is 0.6. The first film 25 and the intermediate film 26 are the same in thickness and in material as those of the first embodiment. The first hole 25a made in the firs film 25 is a square of 400 nm×400 nm as in the first embodiment.

The second film is composed of two layers, namely, an Sb layer 28 with a thickness of 5 nm and an Au layer 29 with a thickness of 25 nm. While this two-layered film is heated to approximately 300° C. by a heater, the laser beam is incident to the solid immersion lens 15C and is converged on the first hole 25a. Then, under the high temperature, Au and Sb are diffused and alloyed with each other, and a minuscule light transmitting portion 30 is made. This light transmitting portion 30 is a circle with a diameter of approximately 200 nm and has the same function as the second hole 27a. Therefore, the third embodiment brings the same function and the same effects as the first embodiment does.

As the two-layered second film, various materials can be used as long as they are capable of being alloyed with each other to obtain light transmittance. Instead of Au, Ag, Pt, Pd, etc. are usable, and instead of Sb, Si, Ge, etc. are usable.

Other Embodiments

Not only the solid immersion lenses but also probes made of high-refractive materials can be used as near field light emitting elements. The first film, the second film and the intermediate film can be made of various materials suitably selected. The incident optical system and the reading optical system may be of any structure.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A near field light emitting element comprising:
an element body;
a first film which is provided on an emergent side of the element body and has a first light transmitting portion;
an intermediate film which is provided on an emergent side of the first film; and
a second film which is provided on an emergent side of the intermediate film and has a second light transmitting portion which is smaller in area than the first light transmitting portion.

2. The near field light emitting element according to claim 1, wherein at least one of the first light transmitting portion and the second light transmitting portion is a minuscule hole made in the corresponding film.

3. The near field light emitting element according to claim 1, wherein at least one of the first film and the second film comprises a multi-layered film, and the corresponding light transmitting portion is a minuscule light transmitting portion which is provided in the multi-layered film by alloying materials of the multi-layered film with each other under a high temperature.

4. The near field light emitting element according to claim 1, wherein:
the first light transmitting portion and the second light transmitting portion are slit-like apertures extending in parallel to each other; and
the second light transmitting portion has a smaller width than the first light transmitting portion.

5. The near field light emitting element according to claim 1, wherein the first light transmitting portion has a width smaller than a wavelength of incident light.

6. The near field light emitting element according to claim 1, wherein the element body is a solid immersion lens.

7. A near field light emitting element comprising:
a solid immersion lens;
a first film which is provided on an emergent surface of the solid immersion lens and has a first aperture;
an intermediate film which is provided on a surface of the first film; and
a second film which is formed on a surface of the intermediate film and has a second aperture which is smaller in area than the first aperture.

8. The near field light emitting element according to claim 7, wherein the second aperture has a smaller width than the first aperture.

9. The near field light emitting element according to claim 7, wherein the first aperture and the second aperture are made in such positions as to overlap.

10. The near field light emitting element according to claim 7, wherein the first aperture has a width smaller than a wavelength of incident light.

11. The near field light emitting element according to claim 7, wherein at least one of the first film and the second film is a multi-layered film which becomes light transmitting by being alloyed under a high temperature.

12. An optical head comprising:
a light source; and
a near field light emitting element to which light is incident from the light source, said near field light emitting element comprising:
an element body;
a first film which is provided on an emergent surface of the element body and has a first aperture;
an intermediate film which is provided on a surface of the first film; and
a second film which is formed on a surface of the intermediate film and has a second aperture which is smaller in area than the first aperture.

13. The optical head according to claim 12, wherein the second aperture has a smaller width than the first aperture.

14. The optical head according to claim 12, wherein the first aperture and the second aperture are located in such positions to overlap.

15. The optical head according to claim 12, wherein the first aperture has a width smaller than a wavelength of light emitted from the light source.

16. The optical head according to claim 12, wherein at least one of the first film and the second film is a multi-layered film which becomes light transmitting by being alloyed under a high temperature.

17. The optical head according to claim 12, wherein the first aperture and the second aperture are slits extending in parallel to each other.

18. The optical head according to claim 17, wherein the second aperture has a smaller width than the first aperture.

19. The optical head according to claim 17, further comprising a polarizer which polarizes light emitted from the light source so that a direction of polarization of the light corresponds to an extending direction of the first and second slits.

* * * * *